US011110342B2

(12) United States Patent
Erwin et al.

(10) Patent No.: US 11,110,342 B2
(45) Date of Patent: Sep. 7, 2021

(54) PUZZLE ASSEMBLY SYSTEM AND METHOD

(71) Applicants: Hannah Erwin, Chapel Hill, NC (US); Wanda Joy Martin, Lexington, KY (US); Dianne Embry, Lexington, KY (US); Cynthia Clark, Chapel Hill, NC (US)

(72) Inventors: Hannah Erwin, Chapel Hill, NC (US); Wanda Joy Martin, Lexington, KY (US); Dianne Embry, Lexington, KY (US); Cynthia Clark, Chapel Hill, NC (US)

( * ) Notice: Subject to any disclaimer, the term of this patent is extended or adjusted under 35 U.S.C. 154(b) by 0 days.

(21) Appl. No.: 16/413,566

(22) Filed: May 15, 2019

(65) Prior Publication Data
US 2020/0101371 A1   Apr. 2, 2020

Related U.S. Application Data

(60) Provisional application No. 62/740,364, filed on Oct. 2, 2018.

(51) Int. Cl.
*A63F 9/06*       (2006.01)
*G02B 25/00*   (2006.01)

(52) U.S. Cl.
CPC .......... *A63F 9/0613* (2013.01); *G02B 25/002* (2013.01); *A63F 2009/0634* (2013.01)

(58) Field of Classification Search
CPC ..... A61B 1/227; A61B 5/0084; A61B 3/1208; A61B 2560/0443; A61B 17/50; A61B 1/00103; A61B 1/00105; A61B 1/00163; A61B 1/0669; A61B 2017/00734; A61B 2017/505; A61B 2090/309; A61B 3/0008; A61B 3/10; A61B 3/107; A61B 3/117; A61B 18/12; A61B 18/1442; A61B 1/00052; A61B 1/0008; A61B 1/00108; A61B 1/00195; G02B 25/02; G02B 25/002; G02B 25/005; G02B 27/025
USPC .................. 359/803, 811, 813, 815, 819–824
See application file for complete search history.

(56) References Cited

U.S. PATENT DOCUMENTS

| | | | |
|---|---|---|---|
| 3,945,717 A | 3/1976 | Ryder | |
| 6,483,651 B1 | 11/2002 | Maurer | |
| 6,565,089 B1 | 5/2003 | Matos | |
| 8,335,044 B1 * | 12/2012 | Besse | ................... G02B 27/025 |
| | | | 359/803 |

(Continued)

FOREIGN PATENT DOCUMENTS

JP       2014-050420       *   3/2014   ............... A63F 9/10

*Primary Examiner* — Brandi N Thomas
(74) *Attorney, Agent, or Firm* — Michael C. Balaguy

(57) ABSTRACT

A puzzle assembly system including a puzzle assembly tool having a handle; an illuminator; a powerer; and a magnifier having a body with a front-face; a rear-face; a thickness; and a periphery; wherein the puzzle assembly tool comprises the handle, the illuminator, and the magnifier in functional combination. The illuminator is preferably integral with the handle and powered by the powerer during use. The illuminator is configured to illuminate puzzle pieces for assembly. As designed the magnifier is configured to magnify the puzzle pieces during use (via a magnifying lens) and the puzzle pieces are able to be manipulated via a user moving the body of the magnifier during puzzle-assembly to scoop and place sections or individual puzzle pieces.

15 Claims, 5 Drawing Sheets

(56) References Cited

U.S. PATENT DOCUMENTS

| | | | |
|---|---|---|---|
| 8,743,278 B2 * | 6/2014 | Yoon | G02B 25/002 |
| | | | 348/373 |
| 2003/0063459 A1 * | 4/2003 | McChesney | G02B 25/02 |
| | | | 362/98 |
| 2005/0270768 A1 | 12/2005 | Lin | |
| 2010/0073545 A1 * | 3/2010 | Rodriquez | G02B 25/005 |
| | | | 348/333.12 |

* cited by examiner

PUZZLE ASSEMBLY SYSTEM AND METHOD

CROSS-REFERENCE TO RELATED APPLICATION(S)

The present application is related to and claims priority to U.S. Provisional Patent Application No. 62/740,364 filed Oct. 2, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of game accessories of existing art and more specifically relates to puzzles.

RELATED ART

Many individuals enjoy assembling puzzles for entertainment. Puzzles typically come in pieces to be assembled as a game. The puzzles are often challenging and may require dexterity. Older individuals may have problems not only with joining individual pieces but with joining sections of assembled effectively. Further, those with poor eyesight may strain to see detail on the pieces being assembled. A means to help facilitate ease of puzzle assembling is desired.

U.S. Pat. No. 5,403,005 to Jesus Avila-Valdez relates to a game and puzzle board. The described game and puzzle board includes a rectangular frame of interconnected side members which forms a border for a working area designed to receive a plurality of different puzzle pieces. The side members of the frame include a plurality of holes extending therethrough. The puzzle pieces are provided with a plurality of transverse passageways extending through the puzzle pieces so that when the puzzle pieces are properly arranged within the working area, the holes and passageways are generally aligned. Elongated pin elements are inserted into the aligned passageways and holes to maintain the puzzle pieces at a fixed position within the frame member. When not in use, the frame member, with assembled puzzle pieces and locking pins, may be stored by inserting the frame into a channel formed in a base member. The non-assembled puzzle pieces may be stored by inserting the pin elements through passageways in the puzzle pieces and then inserting the pin elements in cavities formed in the base member. In preferred form, the puzzle pieces are arranged to form a checkerboard or chessboard pattern.

SUMMARY OF THE INVENTION

In view of the foregoing disadvantages inherent in the known puzzle art, the present disclosure provides a novel puzzle assembly system and method. The general purpose of the present disclosure, which will be described subsequently in greater detail, is to provide a puzzle assembly system and method.

A puzzle assembly system is disclosed herein, the system comprising: a puzzle assembly tool having a handle; an illuminator; a powerer; and a magnifier having a body with a front-face; a rear-face; a thickness; and a periphery; wherein the puzzle assembly tool comprises the handle, the illuminator, and the magnifier in functional combination. The illuminator is preferably integral with the handle and powered by the powerer during use. The illuminator is configured to illuminate puzzle pieces for assembly, the body of the magnifier defined by the front-face, and the rear-face integrally joined via the thickness and is surrounded by the periphery. As designed the magnifier is configured to magnify the puzzle pieces during use (via a magnifying lens) and the puzzle pieces are able to be manipulated via a user moving the body of the magnifier during puzzle-assembly to scoop and place sections or individual puzzle pieces.

A method of use for the puzzle assembly system is also disclosed herein, the method comprising the steps of: providing a puzzle assembly tool having a handle; an illuminator; a powerer; and a magnifier having a body with a front-face; a rear-face; a thickness; and a periphery; the puzzle assembly tool comprises the handle, the illuminator, and the magnifier in functional combination; and assembling puzzle pieces using the puzzle assembly tool via using the magnifier. The method may further comprise the step of scooping of assembled sections of the puzzle pieces to join with other sections of assembled sections of the puzzle pieces (eventually to form the whole completed puzzle).

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a puzzle assembly system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a puzzle assembly accessory and more particularly to a puzzle assembly system as used to improve the ease of assembling of puzzles.

Generally, the present disclosure comprises a tool made preferably of plastic and shaped similar to a kitchen spatula (suitable for scooping, holding during transport, and placing of scooped items). A 'flat' cross-section may be about 3" in preferred embodiments and has magnifying means. A handle may be a 'clip on' or integral. In embodiments wherein the handle is 'clip on', a claw on the handle may clip onto a channeled track upon the flat cross section (also referred to as a planar body). The tool is useful for assembling jigsaw puzzles allowing the puzzle-maker user to assemble portions of the puzzle in one area and move and attach that area to the greater puzzle keeping the assembled pieces intact. The magnifier is a lens and allows the user to see intricate artwork on the puzzle piece for ease of completion.

Referring now more specifically to the drawings by numerals of reference, there is shown in FIGS. 1-4, various views of a puzzle assembly system 100.

Figure 1:
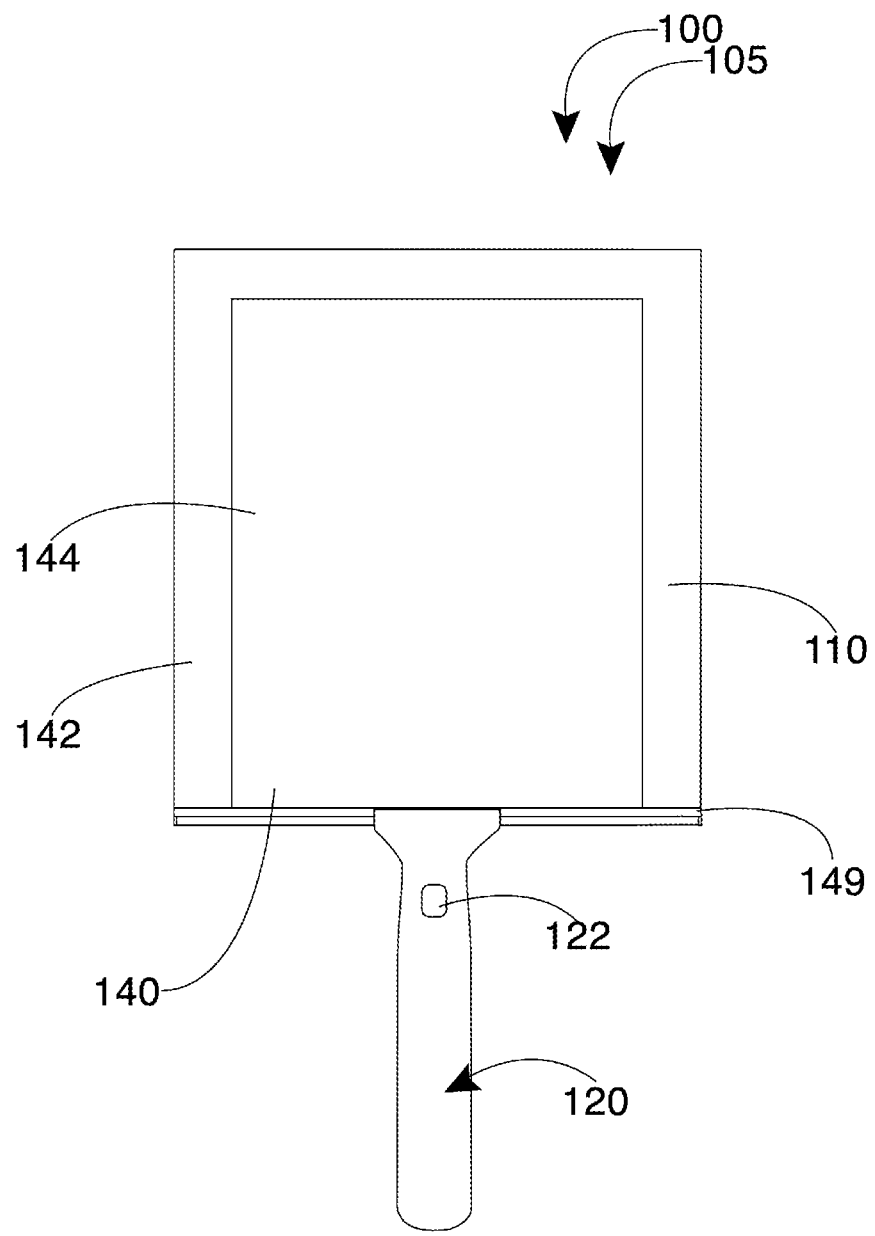
FIG. 1 is a top view of the puzzle assembly system during an 'in-use' condition, according to an embodiment of the disclosure.
Figure 2:
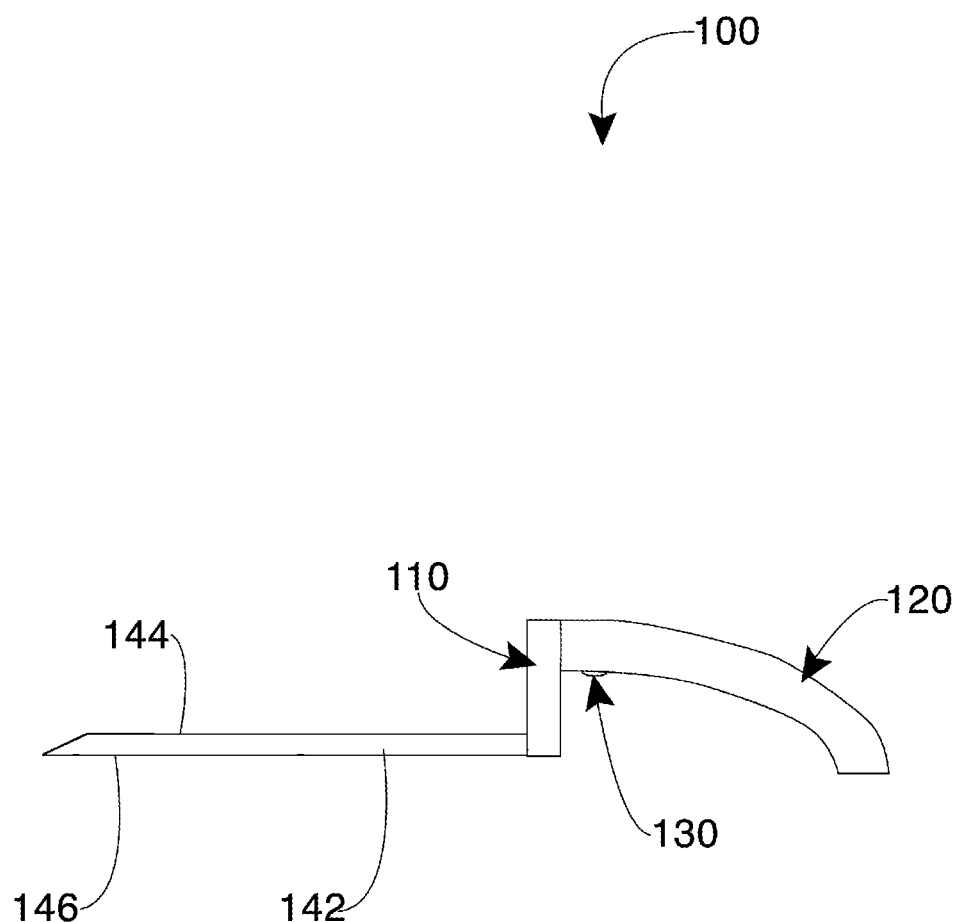
FIG. 2 is a side view of the puzzle assembly system of FIG. 1, according to an embodiment of the present disclosure.
Figure 3:
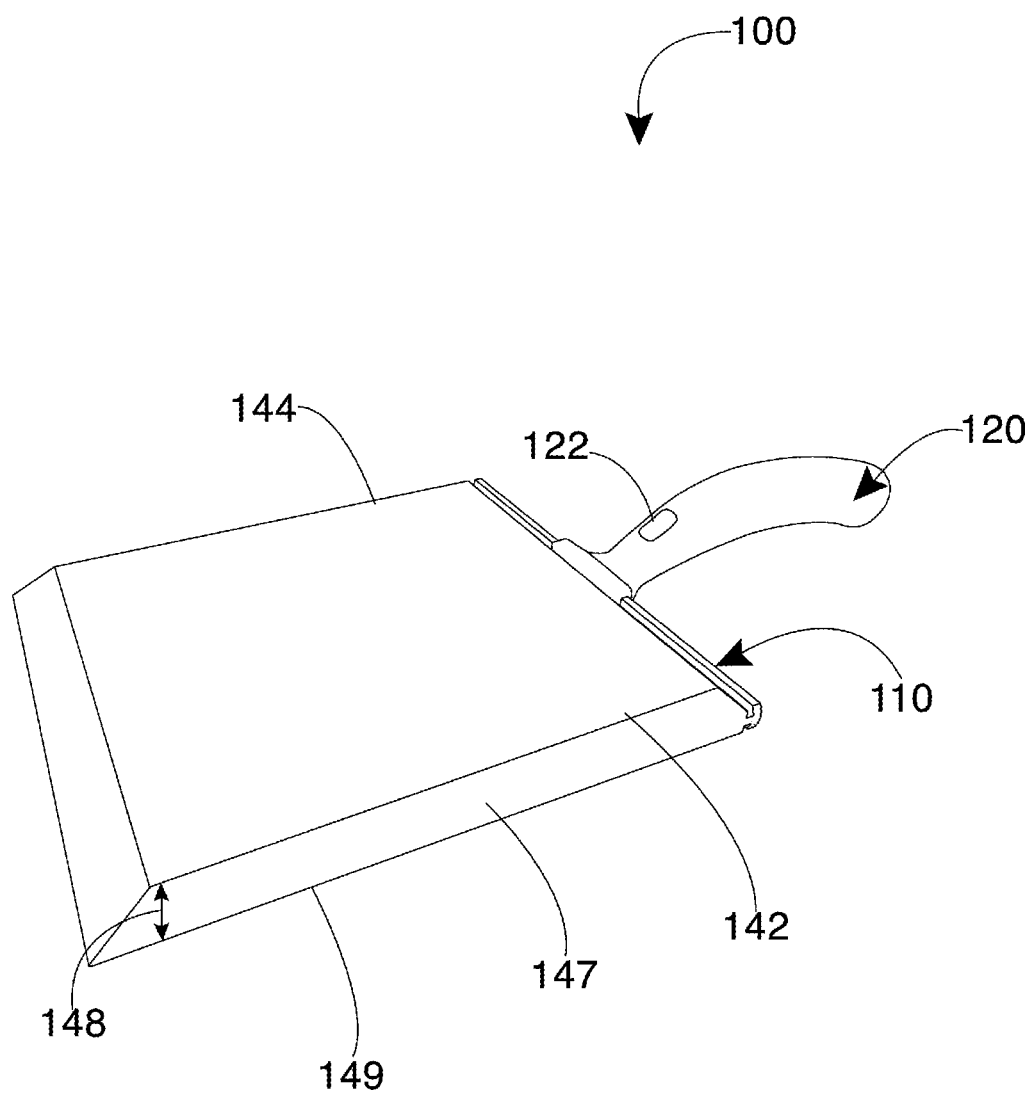
FIG. 3 is a top perspective view of the puzzle assembly system of FIG. 1, according to an embodiment of the present disclosure.
Figure 4:
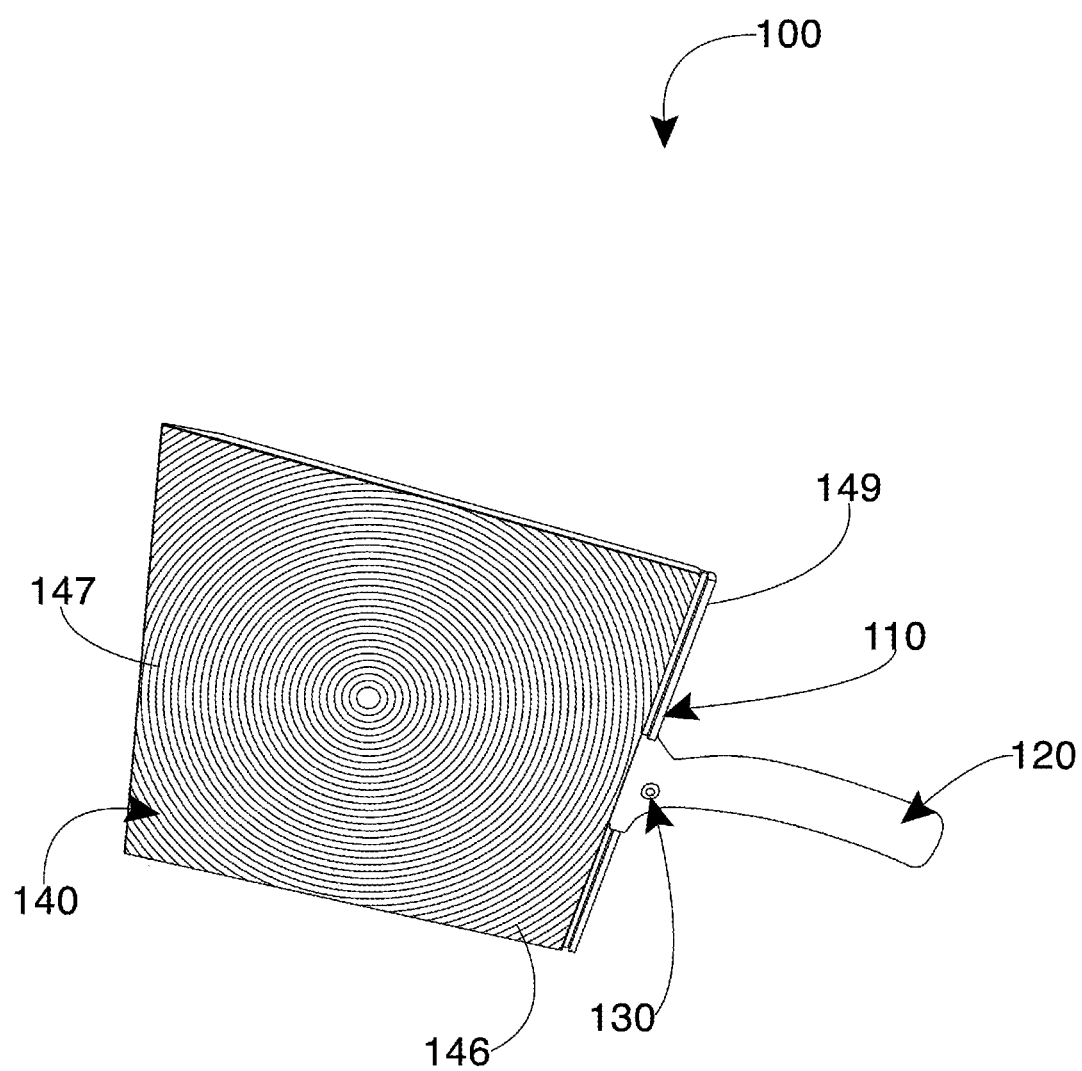
FIG. 4 is a bottom perspective view of the puzzle assembly system of FIG. 1, according to an embodiment of the present disclosure.

FIG. 1 shows a puzzle assembly system 100 during an 'in-use' condition 50, according to an embodiment of the present disclosure. Here, the puzzle assembly system 100 may be beneficial for use by a user to facilitate puzzle assembly. As illustrated, the puzzle assembly system 100 may include a puzzle assembly tool 110 having a handle 120; an illuminator 130; a powerer; and a magnifier 140 having a body 142 with a front-face 144; a rear-face 146; a thickness 148; and a periphery 149 (may be a frame). As designed the puzzle assembly tool comprises the handle 120, the illuminator 130, and the magnifier 140 in functional combination.

The illuminator 130 is preferably integral with the handle 120 and powered by the powerer during use. The illuminator 130 is configured to illuminate puzzle pieces for assembly. The body 142 of the magnifier 140 is defined by the front-face 144, and the rear-face 146 integrally joined via the thickness 148 and is surrounded by the periphery 149. The periphery 149 may or may not comprise a frame. As designed the magnifier 140 is configured to magnify the puzzle pieces during use via the lens 147 and the puzzle pieces are able to be manipulated via a user moving the body 142 of the magnifier 140 during puzzle-assembly to scoop and place sections of partially assembled puzzle pieces or individual puzzle pieces.

Referring now to the body 142; the body 142 preferably comprises a planar profile as shown; wherein the body 142 is substantially rectangular in preferred embodiments. The body 142 is flexible and yet may be semi-rigid, able to deform as needed when scooping yet can hold and transport a plurality of puzzle pieces without dropping during the movement. The body 142 preferably comprises a beveled edge to facilitate scooping of assembled sections of the puzzle pieces. The thickness 148 of the magnifier 140 comprises a (magnifying) lens 147; wherein the lens 147, when used, helps a user see greater definition of the puzzle pieces via magnification. The lens 147 may comprise low magnifying power between 2×-6×, or 6×, or greater. The lens 147 may comprise a suitable means to protect it from being scratched when manipulating puzzle pieces. The present invention is multi-purpose having capacity to be used as a magnifying glass and as a scooper/transporter/placer. The lens 147 is preferably transparent. Those with ordinary skill in the art will now appreciate that upon reading this specification and by their understanding the art of lens and magnification as described herein, methods and means of magnification and protection from scratching magnification ranges used will be understood by those knowledgeable in such art.

The powerer comprises at least one battery which may be rechargeable. In most embodiments the battery is housed in the handle 120 and can be switched out to be discarded for a new battery or charged as needed. The illuminator 130 is activatable via a button 122 or other suitably equivalent control means may be used to activate and deactivate the illuminator 130 as desired. The handle 120 is preferably arcuate (as shown) for ease of gripping and manipulation during use. The illuminator 130 illuminates from a bottom side of the handle 120; the illuminator 130 preferably comprises an LED light or in alternate embodiments comprises a non-LED light.

According to one embodiment, the puzzle assembly system 100 may be arranged as a kit 105. In particular, the puzzle assembly system 100 may further include a set of instructions 107. The instructions 107 may detail functional relationships in relation to the structure of the puzzle assembly system 100 such that the puzzle assembly system 100 can be used, maintained, or the like, in a preferred manner.

Figure 5:
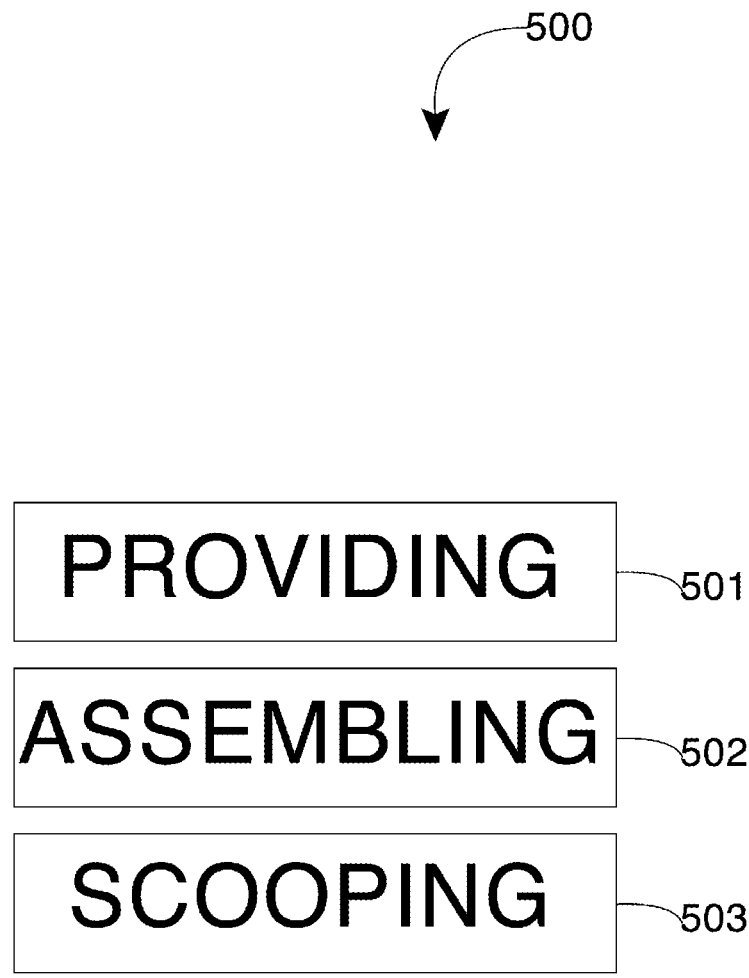
FIG. 5 is a flow diagram illustrating a method of using a puzzle assembly system according to an embodiment of the present disclosure.

FIG. 5 is a flow diagram illustrating a method for using 500 the puzzle assembly system 100, according to an embodiment of the present disclosure. In particular, the method of use 500 may include one or more components or features of the puzzle assembly system 100 as described above. As illustrated, the method of use 500 may include the steps of: step one 501, providing a puzzle assembly tool having a handle; an illuminator; a powerer; and a magnifier having a body with a front-face; a rear-face; a thickness; and a periphery; the puzzle assembly tool comprises the handle, the illuminator, and the magnifier in functional combination; step two 502, assembling puzzle pieces using the puzzle assembly tool via using the magnifier; step three 503, scooping of assembled sections of the puzzle pieces to join with other sections of assembled sections of the puzzle piece.

It should be noted that step 503 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for use, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A puzzle assembly system, the system comprising:
   a puzzle assembly tool having
      a handle;
      an illuminator;
      a powerer; and
      a planar body constructed of a unitary sheet of semi-rigid plastic having magnifying properties, the planar body comprising
         a rectangular front-face;
         a rectangular rear-face;
         a thickness separating the front-face from the rear-face;
         an interface able to affix to the handle; and
         a periphery;
      wherein said puzzle assembly tool comprises said handle, said illuminator, and said planar body in functional combination, said illuminator integral with said handle and powered by said powerer during use, said illuminator configured to illuminate puzzle pieces for assembly, said planar body defined by said rectangular front-face, said rectangular rear-face integrally joined via said thickness and surrounded by said periphery, said planar body configured to magnify said puzzle pieces during use and said puzzle pieces able to be manipulated via said planar body of said magnifier during puzzle-assembly.

2. The puzzle assembly system of claim 1, wherein said planar body is flexible.

3. The puzzle assembly system of claim 1, wherein said powerer comprises at least one battery.

4. The puzzle assembly system of claim 1, wherein the illuminator is activatable via a button.

5. The puzzle assembly system of claim 1, wherein the planar body comprises a beveled edge.

6. The puzzle assembly system of claim 1, wherein the handle is arcuate.

7. The puzzle assembly system of claim 1, wherein the illuminator illuminates from a bottom side of said handle.

8. The puzzle assembly system of claim 1, wherein the illuminator comprises an LED light.

9. The puzzle assembly system of claim 1, wherein the illuminator comprises a non-LED light.

10. The puzzle assembly system of claim 1, wherein the thickness of said planar body comprises a lens.

11. The puzzle assembly system of claim 10, wherein the lens comprises a Fresnel lens.

12. The puzzle assembly system of claim 1, wherein the interface comprises a channeled track.

13. The puzzle assembly system of claim 12, wherein the handle comprises a claw able to affix to the channeled track of the interface.

14. A puzzle assembly system, the system comprising:
   a puzzle assembly tool having
      a handle;
      an illuminator;
      a powerer; and
      a planar body constructed of a unitary sheet of semi-rigid plastic having magnifying properties, the planar body comprising
         a rectangular front-face;
         a rectangular rear-face;
         a thickness separating the front-face from the rear-face;
         an interface able to affix to the handle; and
         a periphery;
   wherein said puzzle assembly tool comprises said handle, said illuminator, and said planar body in functional combination, said illuminator integral with said handle and powered by said powerer during use, said illuminator configured to illuminate puzzle pieces for assembly, said planar body defined by said rectangular front-face, said rectangular rear-face integrally joined via said thickness and surrounded by said periphery, said planar body configured to magnify said puzzle pieces during use and said puzzle pieces able to be manipulated via said planar body of said magnifier during puzzle-assembly;
      wherein said powerer comprises at least one battery;
      wherein the illuminator is activatable via a button;
      wherein the planar body comprises a beveled edge;
      wherein the handle is arcuate;
      wherein the illuminator illuminates from a bottom side of said handle when activated;
      wherein the illuminator comprises an LED light;
      wherein the thickness of said planar body comprises a lens;
      wherein the lens, when used, helps a user see greater definition of said puzzle pieces via magnification; and
      wherein the lens comprises low magnifying power between 2x-6x.

15. The puzzle assembly system of claim 14, further comprising set of instructions; and
      wherein the puzzle assembly system is arranged as a kit.

* * * * *